US012415320B2

(12) United States Patent
Van Iersel et al.

(10) Patent No.: US 12,415,320 B2
(45) Date of Patent: Sep. 16, 2025

(54) METHOD AND APPARATUS FOR PRODUCING AN OBJECT BY MEANS OF ADDITIVE MANUFACTURING

(71) Applicant: Additive Industries B.V., Eindhoven (NL)

(72) Inventors: Sven Sijmen Van Iersel, Eindhoven (NL); Mark Herman Else Vaes, Eindhoven (NL)

(73) Assignee: Additive Industries B.V., Eindhoven (NL)

( * ) Notice: Subject to any disclaimer, the term of this patent is extended or adjusted under 35 U.S.C. 154(b) by 337 days.

(21) Appl. No.: 17/604,150

(22) PCT Filed: Mar. 20, 2020

(86) PCT No.: PCT/NL2020/050187
§ 371 (c)(1),
(2) Date: Oct. 15, 2021

(87) PCT Pub. No.: WO2020/242293
PCT Pub. Date: Dec. 3, 2020

(65) Prior Publication Data
US 2022/0194008 A1    Jun. 23, 2022

(30) Foreign Application Priority Data

May 28, 2019    (NL) ..................... 2023217

(51) Int. Cl.
*B29C 64/393*    (2017.01)
*B22F 10/20*    (2021.01)
(Continued)

(52) U.S. Cl.
CPC .......... *B29C 64/393* (2017.08); *B29C 64/153* (2017.08); *B29C 64/35* (2017.08);
(Continued)

(58) Field of Classification Search
CPC ..... B29C 64/386; B29C 64/393; B29C 64/35; B29C 64/357; B22F 10/68; B22F 10/73
See application file for complete search history.

(56) References Cited

U.S. PATENT DOCUMENTS

2002/0090410 A1*  7/2002  Tochimoto ............ B29C 64/357
                                                    425/215
2018/0185915 A1*  7/2018  Beauchamp ............ B22F 12/90
(Continued)

FOREIGN PATENT DOCUMENTS

NL        2013860 B1   10/2016
WO    WO-2016085334 A2 *  6/2016  .............. B22F 10/00

OTHER PUBLICATIONS

International Search Report and Written Opinion mailed Jun. 16, 2020 for PCT/NL2020/050187.

*Primary Examiner* — Susan D Leong
*Assistant Examiner* — Vipul Malik
(74) *Attorney, Agent, or Firm* — Suiter Swantz IP

(57) ABSTRACT

An additive manufacturing method including the steps of receiving a bath of powdered material having a surface level defining an object working area, solidifying a selective layer-part of the bath of powdered material on the surface level, extracting powdered material originating from the bath of powdered material, and controlling at least one of an extraction rate of an extraction device for extracting powdered material originating from the bath of powdered material, and a separation rate of a separation device configured to filter and/or sieve powdered material originating from the bath of powdered material.

9 Claims, 12 Drawing Sheets

(51) Int. Cl.
*B22F 10/322* (2021.01)
*B22F 10/73* (2021.01)
*B29C 64/153* (2017.01)
*B29C 64/35* (2017.01)
*B29C 64/386* (2017.01)
*B33Y 10/00* (2015.01)
*B33Y 30/00* (2015.01)
*B33Y 40/00* (2020.01)
*B33Y 50/00* (2015.01)
*B22F 12/44* (2021.01)
*B22F 12/70* (2021.01)
*B22F 12/90* (2021.01)

(52) U.S. Cl.
CPC ............ *B29C 64/386* (2017.08); *B33Y 10/00* (2014.12); *B33Y 30/00* (2014.12); *B33Y 40/00* (2014.12); *B33Y 50/00* (2014.12); *B22F 10/20* (2021.01); *B22F 10/322* (2021.01); *B22F 10/73* (2021.01); *B22F 12/44* (2021.01); *B22F 12/70* (2021.01); *B22F 12/90* (2021.01)

(56) References Cited

U.S. PATENT DOCUMENTS

2019/0151954 A1* 5/2019 Xiao ........................ B22F 12/90
2021/0323232 A1* 10/2021 Schmale ............... B29C 64/209
2021/0402694 A1* 12/2021 Krasowski .............. B29C 64/35

* cited by examiner

METHOD AND APPARATUS FOR PRODUCING AN OBJECT BY MEANS OF ADDITIVE MANUFACTURING

TECHNICAL FIELD AND BACKGROUND

The present disclosure relates according to a first aspect to a method for producing an object by means of additive manufacturing using an apparatus.

According to a second aspect the present disclosure relates to an apparatus for manufacturing an object by means of additive manufacturing.

3D printing or additive manufacturing refers to any of various processes for manufacturing a three-dimensional object in which material is joined or solidified under computer control to create a three-dimensional object, with material being added together, typically layer by layer.

NL2013860 discloses an apparatus to print a three-dimensional object, wherein the apparatus comprises:
- a process chamber for receiving a bath of powdered material, wherein a surface level of said bath of powdered material defines an object working area;
- a solidifying device for solidifying a selective layer-part of said material on said surface level;
- an extraction device for fluid flow connected to said process chamber and arranged for extracting powdered material originating from said bath of powdered material.

One of the challenges of the known apparatus is how to realize a relative large manufacturing output.

BRIEF SUMMARY

It is an object of the present disclosure to provide an apparatus and a method for producing an object, by additive manufacturing, that allows to realize a relative large manufacturing output.

This objective is achieved by the method according to the present disclosure using an apparatus that comprises:
- a controlling device arranged for controlling at least one of:
  - said extraction device for realising an extraction rate of extracting powdered material originating from said bath of powdered material; and
  - a separating device for realising a separation rate of filtering and/or sieving said powdered material originating from said bath of powdered material.

Controlling the extraction device for realising the extraction rate and/or controlling the separating device for realising the separation rate is beneficial for avoiding, or at least significantly reducing the risk, of affecting the performance of the apparatus and thereby inhibiting a relative large manufacturing output. The present disclosure at least partly relies on the insight that a relative large extraction rate of powdered material originating from the bath of powdered material may influence the performance of a downstream process, such as sieving or filtering by a separating device such as a filter device or a sieving device, for handling the extracted powdered material. A relative large extraction rate is, however, attractive for realizing a relative short time period for extracting said powdered material originating from said bath of powdered material after manufacturing of said object is completed. During manufacturing of said object, a relative large extraction rate may be attractive for re-use of said powdered material during said manufacturing while maintaining a volume of said powdered material comprised by said apparatus relatively small.

By providing the controlling device, the extraction rate of said powdered material originating from the bath of powdered material may be relative high while avoiding, or at least significantly reducing the risk of negatively affecting a downstream process. This may be beneficial for allowing a relative short period of time between subsequent build jobs for building objects. A relative short period of time between subsequent build jobs for building objects is advantageous for realizing a relative large manufacturing output of the apparatus. Moreover, a relative large extraction rate may allow re-use of said extracted material in a relative short time period and thereby avoiding the need for storing a relative large volume of said powdered material.

The downstream process may be performed by a device that is part of the apparatus. Alternatively, the downstream process may be performed by an ancillary equipment coupled to the apparatus. In yet a further embodiment, the downstream process may be performed by a combination of devices that are part of the apparatus and ancillary equipment.

The method according the first aspect of the present disclosure comprises the steps of:
- receiving, in a process chamber, a bath of powdered material, wherein a surface level of said bath of powdered material defines an object working area;
- solidifying, by a solidifying device, a selective layer-part of said bath of powdered material on said surface level;
- extracting, by an extraction device, powdered material originating from said bath of powdered material;
- controlling, by a controlling device, at least one of:
  - said extraction device for realising an extraction rate of extracting powdered material originating from said bath of powdered material; and
  - a separating device for realising a separation rate of filtering and/or sieving said powdered material originating from said bath of powdered material.

By controlling said extraction rate and/or said separating rate a relative high extraction rate of said powdered material originating from the process chamber may be realized while avoiding, or at least significantly reducing the risk of negatively affecting a downstream process. This is beneficial for allowing a relative short period of time between subsequent build jobs for building objects. Moreover, a relative large extraction rate may allow re-use of said extracted material in a relative short time period and thereby avoiding the need for storing a relative large volume of said powdered material.

A further advantage of the method according to the first aspect of the present disclosure is that by controlling the extraction rate, the performance of a downstream process may be controlled. The present disclosure further at least partly relies on the insight that the extraction rate may have an influence on the amount of powder that may be recovered and re-used for a further manufacturing process for manufacturing an object by means of additive manufacturing. In particular it is noted that a relative high extraction rate may negatively affect a separating process such as a filtering process or a sieving process causing for instance clogging of the separating device such as the filter device or the sieving device and thereby reduce recuperation of powdered material. Alternatively, a relative high extraction rate may reduce the effectiveness of a downstream process and cause powdered material to be collected at an undesired position in said apparatus.

Within the context of the present disclosure a separating device is a device that is arranged for separating the powdered material originating from said bath of powdered materials in at least two fractions. Preferably a first fraction of said at least two fractions may beneficially be re-used for producing an object by means of additive manufacturing. Preferably, a second fraction of said at least two fractions comprises powdered material that may not be directly re-used for producing an object by means of additive manufacturing. The second fraction may for instance require additional processing steps to meet the requirements for producing an object by means of additive manufacturing.

It is conceivable that in an embodiment either the first fraction or the second fraction is substantially zero, preferably zero. In this embodiment, said separating device is arranged for separating the powdered material originating from said bath of powdered material from a carrier such as air transporting said powdered material.

The separating device is arranged for realising a separation rate, wherein the separation rate may be defined by a volume flow of said powdered material separated by said separating device and/or a mass flow of said powdered material separated by said separating device. The volume flow of said powdered material separated by said separating device comprises at least a first volume flow related to said first fraction and a second volume flow related to said second fraction. The mass flow of said powdered material separated by said separating device comprises at least a first mass flow related to said first fraction and a second mass flow related to said second fraction.

Preferably, during said step of controlling, said extraction device is controlled such that said extraction rate is maintained below an upper extraction rate and/or said separation device is controlled such that said separation rate is below an upper separation rate, preferably is maintained below an upper separation level. This is beneficial for avoiding, or at least significantly reducing the risk, of negatively affecting a downstream process. In particular, an extraction rate exceeding the upper extraction rate may cause the downstream process to be performed under less favourable conditions, such as above an upper separation rate, or may cause the downstream process to be interrupted. Interruption may for instance occur due to clogging of a separating device such as a sieving device or a filter device as part of a downstream process.

It is advantageous if said separation rate is higher than said extraction rate. This is advantageous for avoiding, or at least significantly reducing the risk, of affecting the performance of the apparatus and thereby inhibiting a relative large manufacturing output.

It is beneficial if during said step of controlling, said extraction device is controlled such that a predetermined extraction rate is realised and/or said separation device is controlled such that a predetermined separation rate is realised. A predetermined extraction rate and/or a predetermined separation rate may be beneficial for realizing and/or maintaining a relative fast removal of powdered material originating from said bath of powdered material. A relative large variation of the extraction rate and/or a relative large variation of the separation rate may cause relative unfavourable operation conditions to the downstream process.

Preferably, said method further comprises the step of:
 determining, by a determining device, a measure for said extraction rate of said powdered material, realised by said extraction device during said step extracting, originating from said bath of powdered material and/or a measure for said separation rate realised by said separating device arranged for filtering and/or sieving said powdered material originating from said bath of powdered material;

wherein said step of controlling further comprises controlling, by said controlling device, at least one of:
 said extraction rate, realised by said extraction device, taking into account said determined measure for said extraction rate and/or taking into account said determined measure for said separation rate; and
 said separation rate, realised by said separation device, taking into account said determined measure for said extraction rate and/or taking into account said determined measure for said separation rate.

By providing the determining device, the measure for the extraction rate and/or the measure for the separation rate may be determined. This allows for a relative accurate controlling of said extraction rate and/or said separation rate. This is beneficial for avoiding, or at least significantly reducing the risk of negatively affecting a downstream process such as sieving or filtering by the separating device. Moreover, when controlling both the extraction rate and said separation rate, preferably simultaneously, by said controlling device, the extraction rate and said separation rate may be matched. This is beneficial for allowing a relative short period of time between subsequent build jobs for building objects. A relative short period of time between subsequent build jobs for building objects is advantageous for realizing a relative large manufacturing output of the apparatus. Moreover, a relative large extraction rate may allow re-use of said extracted material in a relative short time period and thereby avoiding the need for storing a relative large volume of said powdered material.

It is advantageous, if during said step of determining, said measure for said extraction rate of said powdered material is at least one of:
 a volume flow of said powdered material, extracted by said extraction device;
 a mass flow of said powdered material, extracted by said extraction device.

Measurement of a volume flow and/or a mass flow of said powdered material is attractive for allowing said determining device to determine said measure in a relative robust manner.

In this regard, it is beneficial if, during said step of determining, said mass flow is determined by determining a time dependent measure of a weight, preferably the weight, of the process chamber. This is beneficial for allowing said extraction of said powdered material originating from said bath of powdered material to take into account the measure of the weight of the process chamber. The measure of the weight of the process chamber may for instance be obtained by taking into account at least one of: said surface level of said bath of powdered material and an actual weight of a part of said apparatus.

Preferably, during said step of determining, said mass flow is determined by determining a time dependent measure of a weight, preferably the weight, of a storage container, wherein said storage container, during said step of extracting, is receiving said extracted powdered material.

In an embodiment of the method according to the first aspect, during said step of determining, said time dependent measure of the weight of the storage container and said time dependent measure of the weight of the process chamber are determined both. This is beneficial for allowing to detect powdered material collecting in between said process chamber and said storage container. Powdered material may for instance collect in recesses or cavities in parts of the apparatus connecting said storage container to said process chamber. Any powdered material that collects between the storage container and the process chamber may affect re-use of powdered material.

In this regard, it is beneficial if said extraction rate is controlled taking into account detection of powdered material collecting in between said process chamber and said storage container. This is beneficial for allowing to reduce said powdered material collecting in between said process chamber and said storage container. The collecting of powdered material may for instance be reduced by increasing the extraction rate, or alternatively by stopping extraction.

A further advantage of determining the time dependent measure of a weight, preferably the weight, of the process chamber, or determining the time dependent measure of the weight, preferably the weight, of the storage container is that based on at least one of these determined measures the amount of powdered material originating from said bath of powdered material that is supplied to said separating device may be determined. Determining the amount of powdered material that is supplied to said separating device is attractive for allowing preventive maintenance of the separating device.

It is beneficial if, during said step of determining, said mass flow and/or volume flow is determined by determining a time dependent measure of a weight, preferably the weight, of a separating device, wherein said separating device, during said step of extracting, is filtering and/or sieving said extracted powdered material. This is beneficial for providing maintenance, such as preventive maintenance to said separating device. The weight of the separating device may increase during use of the separating device due to powdered material originating from the bath of powdered material collecting in the separating device. By detecting the time dependent measure of the weight, preferably the weight, of the separating device a technical end of life of the separating device or an economical end of life of the separating device may be determined.

Alternatively, or in addition to determining the time dependent measure of the weight, preferably the weight, of the separating device, it is advantageous if, during said step of determining, said mass flow and/or volume flow is determined by determining a time dependent measure of pressure drop, preferably the pressure drop, across said separating device. The pressure drop across the separating device may increase during use of the separating device due to powdered material originating from the bath of powdered material collecting in the separating device. By detecting the time dependent measure of the pressure drop, preferably the pressure drop, of the separating device a technical end of life of the separating device or an economical end of life of the separating device may be determined. This is beneficial for providing maintenance, such as preventive maintenance to said separating device.

In this regard, it is beneficial is said apparatus comprises an actuation device arranged for actuating said separating device, wherein said step of extraction comprises the step of:
 actuating, by said actuation device, said separating device.

Actuating said separating device is beneficial for realizing a relative effective and efficient performance of said separating device while realizing a relative high extraction rate.

Preferably, during said step of actuating, said actuation device is vibrated at a frequency and an amplitude, wherein said apparatus is arranged for setting said frequency within a predetermined frequency range and setting said amplitude within a predetermined amplitude range. This is beneficial for realizing a relative effective and efficient performance of said separating device while realizing a relative high extraction rate.

Preferably, said controlling device is further arranged for setting said frequency within said predetermined frequency range and setting said amplitude within said predetermined amplitude range taking into account said determined time dependent measure of the weight, preferably the weight, of the separating device and/or said determined time dependent measure of pressure drop, preferably the pressure drop, across said separating device. This is beneficial for allowing to maintain a relative effective and efficient performance of said separating device over the life time of the separating device while realizing a relative high extraction rate.

In this regard, it is advantageous if said apparatus comprises a detector, preferably an acceleration sensor or a frequency sensor, arranged for detecting a frequency and/or an amplitude of vibration of said separation device, wherein said apparatus is arranged for determining a difference between said detected frequency and/or amplitude of vibration and said set frequency and said set amplitude. The determined difference between said detected frequency and/or amplitude of vibration and said set frequency and said set amplitude provides a measure for a performance of said separating device. A relative large difference between said detected frequency and/or amplitude of vibration and said set frequency and said set amplitude may provide an indication that powdered material originating from said bath of powdered material is collecting in said separating device. Powdered material collecting in said separating device may reduce the effectiveness and efficiency of the separating device requiring at least one of:
 adapting the setting of the frequency;
 adapting the setting of the amplitude;
 adapting a mesh size.

Preferably, during said step of controlling, said method further comprises the step of:
 setting said separation rate, realised by said separating device, to said predetermined separation rate by controlling at least one of:
 said frequency, realised by said actuating device;
 said amplitude, realised by said actuating device;
 a mesh size of said separation device.

Preferably, said method further comprises the step of:
 evaluating, by an evaluating device, that said determined measure of said extraction rate corresponds to an extraction rate that is below a threshold extraction rate; and
 stopping said extraction, by said extraction device, of said powdered material originating from said bath of powdered material.

By providing the evaluating device the determined measure of the extraction rate may be evaluated. The evaluating device may for instance compare the determined measure of said extraction rate with a measure of a threshold extraction rate. In particular, if the evaluation, by the evaluating device, indicates that the extraction rate is below the threshold extraction rate, the extraction device may be stopped. Stopping the extraction device taking into account a threshold extraction rate relies at least partly on the insight that the extraction rate may be relatively low after a relative large volume and/or mass of powdered material origination from said bath of material is extracted. An extraction rate corresponding to the threshold extraction rate or below the threshold extraction rate may be an indication that the powder originating from said bath of material is removed, or at least removed sufficiently.

Preferably, during said step of extracting, said extraction device generates a flow of gas for said extracting and wherein during said step of controlling said flow of gas is controlled for controlling said extraction rate. Providing a flow of gas is beneficial for realizing a relative good extraction of said powdered material. In particular a turbulent flow of gas may allow for a relative fast and thorough removal of powdered material.

Preferably, said method further comprises the steps of:
evaluating, by an evaluating device, that said determined measure of said extraction rate corresponds to an extraction rate that is below a threshold extraction rate; and
increasing said flow of gas, by said extraction device.

By increasing said flow of gas the extraction rate may be increased above said threshold extraction rate.

Preferably, the flow of gas comprises a constant component and a pulsating component, wherein said constant component is arranged for transporting said powdered material originating from said bath of powdered material through the apparatus and wherein said pulsating component is arranged for bringing said powdered material in said constant component of said flow of gas. The pulsating component is arranged for releasing said powdered material, for instance from said bath of powdered material and thereby allow said powdered material to be transported by said constant component. The combination of the constant component and the pulsating component is beneficial for realising a relative good extraction of the powdered material by the extraction device, while maintaining a flow rate of said flow of gas relatively low.

In an embodiment of the method according to the first aspect of the present disclosure, said measure of said weight, preferably the weight, of the storage container is determined by a detector that is arranged for determining said measure of said weight, preferably the weight, of the storage container. Preferably, said detector comprises a weight detector, wherein said weight detector, preferably a load cell, is coupled to said storage container.

In this regard, it is beneficial if said storage container is supported, preferably rigidly supported, by said detector, in said apparatus. This is beneficial for realizing a relative high accuracy of said measure of said weight, preferably determination of the weight, of the storage container.

In this regard, it is advantageous if said storage container is substantially free from external forces acting on said storage container. Any external forces, for instance due to thermal expansion of elements of the apparatus, may negatively affect the determination of said measure of said weight, preferably determination of the weight, of the storage container.

In an embodiment of the method according to the first aspect, wherein said extraction device is arranged for generating a flow of gas for said extracting, said measure of said weight, preferably the weight, of the storage container determined by said detector is corrected for a force, due to a pressure of said flow of gas, acting on said storage container. The flow of gas may result in a pressure difference acting on said storage container and thereby negatively affecting said determining of said measure of said weight, preferably the weight, of the storage container. A correction value may be determined by determining a difference between said measure of said weight, preferably the weight, of the storage container during said flow of said gas and without said flow of said gas or a reduced flow of said gas. Alternatively, a range of correction values may be obtained for a range of pressure differences allowing to correct a determined measure of said weight of said storage container for a range of pressure differences.

Preferably, said method further comprises the steps of:
separating, by a separating element, said bath of powdered material from a part of said process chamber, wherein said separating element is provided at said side of said surface level of said bath of powdered material; and
providing said gas, by said extraction device and/or said further extraction device, for generating said flow of gas for said extracting in a volume of said process chamber between said separating element and said surface level.

In this regard, it is advantageous if during said step of providing said gas, a pressure in said part of said process chamber is equal or larger than a pressuring in said volume of said process chamber between said separating element and said surface level. This is beneficial for maintaining said separating element in a predetermined position in a relative practical manner.

In an embodiment of the method according to the first aspect of the present disclosure, wherein said apparatus comprises:
a support for positioning a build plate in relation to said surface level of said bath of powdered material, wherein said build plate comprises a build surface that is arranged for receiving said bath of powdered material; and
an exhaust opening that is arranged for exhausting, by said extraction device, said powdered material from said process chamber;
Wherein said method comprises the steps of:
displacing, by said support, said build plate relative to said separating element and/or said exhaust opening.

Displacing said build plate, by said support, is beneficial for positioning powdered material of said bath of powdered material relative to the exhaust opening and thereby realising a relative high extraction rate.

In this regard, it is beneficial if said method further comprises the steps of:
further extracting, by a further extraction device, powdered material originating from said bath of powdered material;
further determining, by a further determining device, a measure for a further extraction rate, realised by said further extraction device during said step of further extracting, of said powdered material originating from said bath of powdered material;
further controlling, by a further controlling device, said further extraction rate taking into account said determined further extraction rate.

Providing the method according to the first aspect of the present disclosure with the steps of further determining, by a further determining device and further controlling, by a further controlling device, is beneficial for realizing a further extraction rate. A further extraction rate may for instance be beneficial for an apparatus wherein multiple extraction rates are favourable for causing multiple downstream processes to be performed at different extraction rates. Alternatively, or in addition, multiple extraction rates may be beneficial in an apparatus that comprises a buffer device for buffering powdered material originating from said bath of powdered material, wherein said buffer device is coupled for flow of said powdered material with said process chamber. Multiple extraction rates allow for instance to remove the powdered material from said process chamber at an extraction rate that differs from an extraction rate of removing said powdered material from said buffer device.

Multiple extraction rates may be beneficial in an apparatus that comprises multiple downstream processes, wherein each downstream process is operated preferably at different extraction rates. Multiple extraction rates allow for instance to sieve powdered material originating from said bath of powdered material by a first separating device at an extraction rate different from an extraction rate for filtering said powdered material originating from said bath of powdered material by a second separating device.

Preferably, during said step of extracting and/or said step of further extracting, by said extraction device and/or said further extraction device, said powdered material is extracted from said process chamber.

In an embodiment of the method according to the first aspect of the present disclosure, during said step of determining, said separation rate is determined by:
  determining a time dependent measure of a weight of said separating device, wherein said separating device, during said step of extracting, is filtering and/or sieving said extracted powdered material originating from said bath of powdered material; and at least one of:
  determining a time dependent measure of a weight of the process chamber;
  determining a time dependent measure of a weight of a storage container, wherein said storage container, during said step of extracting, is receiving said extracted powdered material.

According to the second aspect the present disclosure relates to an apparatus for producing an object by means of additive manufacturing, said apparatus comprising:
  a process chamber for receiving a bath of powdered material, wherein a surface level of said bath of powdered material defines an object working area;
  a solidifying device for solidifying a selective layer-part of said material on said surface level;
  an extraction device for fluid flow connected to said process chamber and arranged for extracting powdered material originating from said bath of powdered material;
  a controlling device arranged for controlling at least one of:
    said extraction device for realising an extraction rate of extracting powdered material originating from said bath of powdered material; and
    a separating device for realising a separation rate of filtering and/or sieving said powdered material originating from said bath of powdered material Embodiments of the apparatus according to the second aspect correspond to embodiments of the method according to the first aspect of the present disclosure. The advantages of the apparatus according to the second aspect correspond to advantages of the method according to first aspect of the present disclosure presented previously.

Preferably, said controlling device is arranged for controlling said extraction rate and/or said separation rate such that said extraction rate and/or said separation rate is maintained below an upper extraction rate. This is beneficial for avoiding, or at least significantly reducing the risk, of negatively affecting a downstream process. In particular, an extraction rate exceeding the upper extraction rate may cause the downstream process to be performed under less favourable conditions or may cause the downstream process to be interrupted. Interruption may for instance occur due to clogging of a separating device such as a sieving device or a filter device as part of a downstream process.

It is beneficial if said controlling device is arranged for controlling said extraction rate and/or said separation rate such that a predetermined extraction rate and/or a predetermined separation rate is realised. A predetermined extraction rate and/or a predetermined separation rate may be beneficial for realizing and/or maintaining a relative fast removal of powdered material originating from said bath of powdered material. A relative large variation of the extraction rate may cause relative unfavourable operation conditions to the downstream process.

Preferably, said controlling device is arranged for controlling said extraction device such that said extraction rate is maintained below an upper extraction rate and/or for controlling said separation device such that said separation rate is below an upper separation rate.

Preferably, said controlling device is arranged for controlling said extraction device such that a predetermined extraction rate is realised and/or for controlling said separation device such that a predetermined separation rate is realised.

Preferably, said apparatus further comprises:
  a determining device arranged for determining a measure for said extraction rate of said powdered material, realised, during use, by said extraction device, originating from said bath of powdered material and/or arranged for determining a measure for said separation rate realised by said separating device arranged for filtering and/or sieving said powdered material originating from said bath of powdered material;
wherein said controlling device is further arranged for controlling at least one of:
  said extraction rate, realised, during use, by said extraction device, taking into account said determined measure for said extraction rate and/or taking into account said determined measure for said separation rate; and
  said separation rate, realised, during use, by said separation device, taking into account said determined measure for said extraction rate and/or taking into account said determined measure for said separation rate.

By providing the determining device, the measure for the extraction rate and/or the measure for the separation rate may be determined. This allows for a relative accurate controlling of said extraction rate and/or said separation rate. This is beneficial for avoiding, or at least significantly reducing the risk of negatively affecting a downstream process such as sieving or filtering by the separating device. Moreover, when controlling both the extraction rate and said separation rate, preferably simultaneously, by said controlling device, the extraction rate and said separation rate may be matched. This is beneficial for allowing a relative short period of time between subsequent build jobs for building objects. A relative short period of time between subsequent build jobs for building objects is advantageous for realizing a relative large manufacturing output of the apparatus. Moreover, a relative large extraction rate may allow re-use of said extracted material in a relative short time period and thereby avoiding the need for storing a relative large volume of said powdered material.

It is advantageous if said determining device is arranged for determining said extraction rate of said powdered material taking into account at least one of:
  a volume flow of said powdered material, in use, extracted by said extraction device;
  a mass flow of said powdered material, in use, extracted by said extraction device.

Preferably, said apparatus comprises an ultrasonic flow meter for determining a measure for said volume flow and/or said mass flow. Within the context of the present disclosure, an ultrasonic flow meter is to be understood as a flow meter that measures the velocity of said powdered material originating from said bath of powdered material with ultrasound to calculate mass flow and/or volume flow. Using ultrasonic transducers, the ultrasonic flow meter can measure the average velocity along the path of an emitted beam of ultrasound, by averaging the difference in measured transit time between the pulses of ultrasound propagating into and against the direction of the flow or by measuring the frequency shift from the Doppler effect.

In this regard, it is beneficial if said determining device is arranged for determining a time dependent measure of a weight, preferably the weight, of the process chamber. This is beneficial for allowing said extraction of said powdered material originating from said bath of powdered material to take into account the measure of the weight of the process chamber.

Preferably, said determining device is arranged for determining a time dependent measure of a weight, preferably the weight, of a storage container, wherein said storage container, during said step of extracting, is receiving said extracted powdered material.

It is beneficial if said determining device is arranged for determining a time dependent measure of a weight, preferably the weight, of a separating device, wherein said separating device, during said step of extracting, is filtering and/or sieving said extracted powdered material. This is beneficial for providing maintenance, such as preventive maintenance to said separating device.

In an embodiment the apparatus further comprises:
an evaluating device that is arranged for evaluating that said determined measure of said extraction rate corresponds to an extraction rate that is below a threshold extraction rate; and
wherein said controlling device is arranged for stopping said extraction, by said extraction device, of said powdered material originating from said bath of powdered material and/or wherein said controlling device is arranged for increasing said flow of gas, by said extraction device.

By providing the evaluating device the determined measure of the extraction rate may be evaluated. The evaluating device may for instance compare the determined measure of said extraction rate with a measure of a threshold extraction rate. In particular, if the evaluation, by the evaluating device, indicates that the extraction rate is below the threshold extraction rate, the extraction device may be stopped. Stopping the extraction device taking into account a threshold extraction rate relies at least partly on the insight that the extraction rate may be relatively low after a relative large volume and/or mass of powdered material origination from said bath of material is extracted. An extraction rate corresponding to the threshold extraction rate or below the threshold extraction rate may be an indication that the powder originating from said bath of material is removed, or at least removed sufficiently.

Preferably, said extraction device is arranged for generating a flow of gas for said extracting and wherein said controlling device is arranged for controlling said flow of gas for controlling said extraction rate. Providing a flow of gas is beneficial for realizing a relative good extraction of said powdered material. In particular a turbulent flow of gas may allow for a relative fast and thorough removal of powdered material.

In an embodiment of the apparatus according to the second aspect of the present disclosure, said apparatus comprises a detector that is arranged for determining said measure of said weight, preferably the weight, of the storage container. Preferably, said detector comprises a weight detector, wherein said weight detector, preferably a load cell, is coupled to said storage container.

In this regard, it is beneficial if said storage container is supported, preferably rigidly supported, by said detector, in said apparatus. This is beneficial for realizing a relative high accuracy of said measure of said weight, preferably the weight, of the storage container.

In this regard, it is advantageous if said storage container is substantially free from external forces acting on said storage container. Any external forces, for instance due to thermal expansion of elements of the apparatus, may negatively affect the determination of said measure of said weight, preferably the weight of the storage container.

Preferably, the apparatus comprises:
a separating element arranged for separating said bath of powdered material from a part of said process chamber, wherein said separating element is provided at said side of said surface level of said bath of powdered material.

In this regard, it is beneficial if said extraction device and/or said further extraction device are arranged for generating said flow of gas for said extracting in a volume of said process chamber between said separating element and said surface level.

It is advantageous if said apparatus is arranged for realizing a pressure in said part of said process chamber, wherein said pressure is equal or larger than a pressure in said volume of said process chamber between said separating element and said surface level. This is beneficial for maintaining said separating element in a predetermined position in a relative practical manner.

Preferably, said apparatus comprises:
a support for positioning a build plate in relation to said surface level of said bath of powdered material, wherein said build plate comprises a build surface that is arranged for receiving said bath of powdered material; and
an exhaust opening that is arranged for exhausting, by said extraction device, said powdered material from said process chamber;
wherein said controlling device is arranged for displacing, by said support, said build plate relative to said separating element and/or said exhaust opening taking into account said determined measure of said extraction rate.

In this regard, it is beneficial if said apparatus further comprises:
a further extraction device arranged for extracting powdered material originating from said bath of powdered material;
a further determining device arranged for determining a measure for a further extraction rate, realised by said further extraction device, of said powdered material originating from said bath of powdered material;
a further controlling device arranged for controlling said further extraction device taking into account said determined further extraction rate.

Providing the apparatus according to the second aspect of the present disclosure with a further extracting device, a further determining device and a further controlling device is beneficial for realizing a further extraction rate. A further extraction rate may for instance be beneficial for an apparatus wherein multiple extraction rates are favourable for causing multiple downstream processes to be performed at different extraction rates. Alternatively, or in addition, multiple extraction rates may be beneficial in an apparatus that comprises a buffer device for buffering powdered material originating from said bath of powdered material, wherein said buffer device is coupled for flow of said powdered material with said process chamber. Multiple extraction rates allow for instance to remove the powdered material from said process chamber at an extraction rate that differs from an extraction rate of removing said powdered material from said buffer device.

Multiple extraction rates may be beneficial in an apparatus that comprises multiple downstream processes, wherein each downstream process is operated preferably at different extraction rates. Multiple extraction rates allow for instance to sieve powdered material originating from said bath of powdered material by a first separating device at an extraction rate different from an extraction rate for filtering said powdered material originating from said bath of powdered material by a second separating device.

Preferably, said extraction device is arranged for extracting said powdered material from said process chamber.

Preferably, said apparatus further comprises:
said separating device arranged for realising said separation rate of filtering and/or sieving said powdered material originating from said bath of powdered material.

BRIEF DESCRIPTION OF THE DRAWINGS

The apparatus and method according to the present disclosure will next be explained by means of the accompanying figures. In the figures.

DETAILED DESCRIPTION

Figure 1:
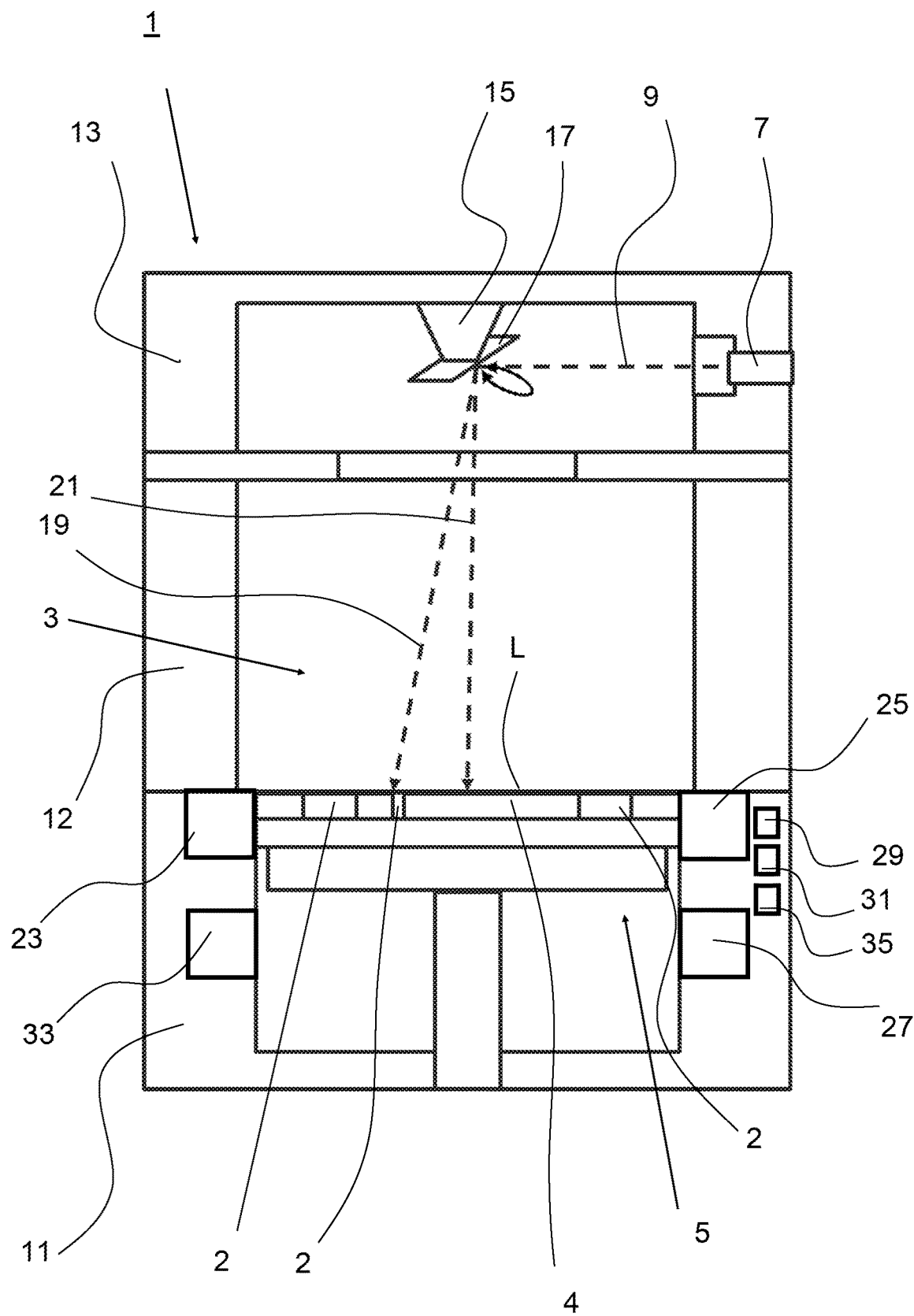
FIG. 1: shows a schematic overview of an apparatus according to the second aspect of the present disclosure.
Figure 2:
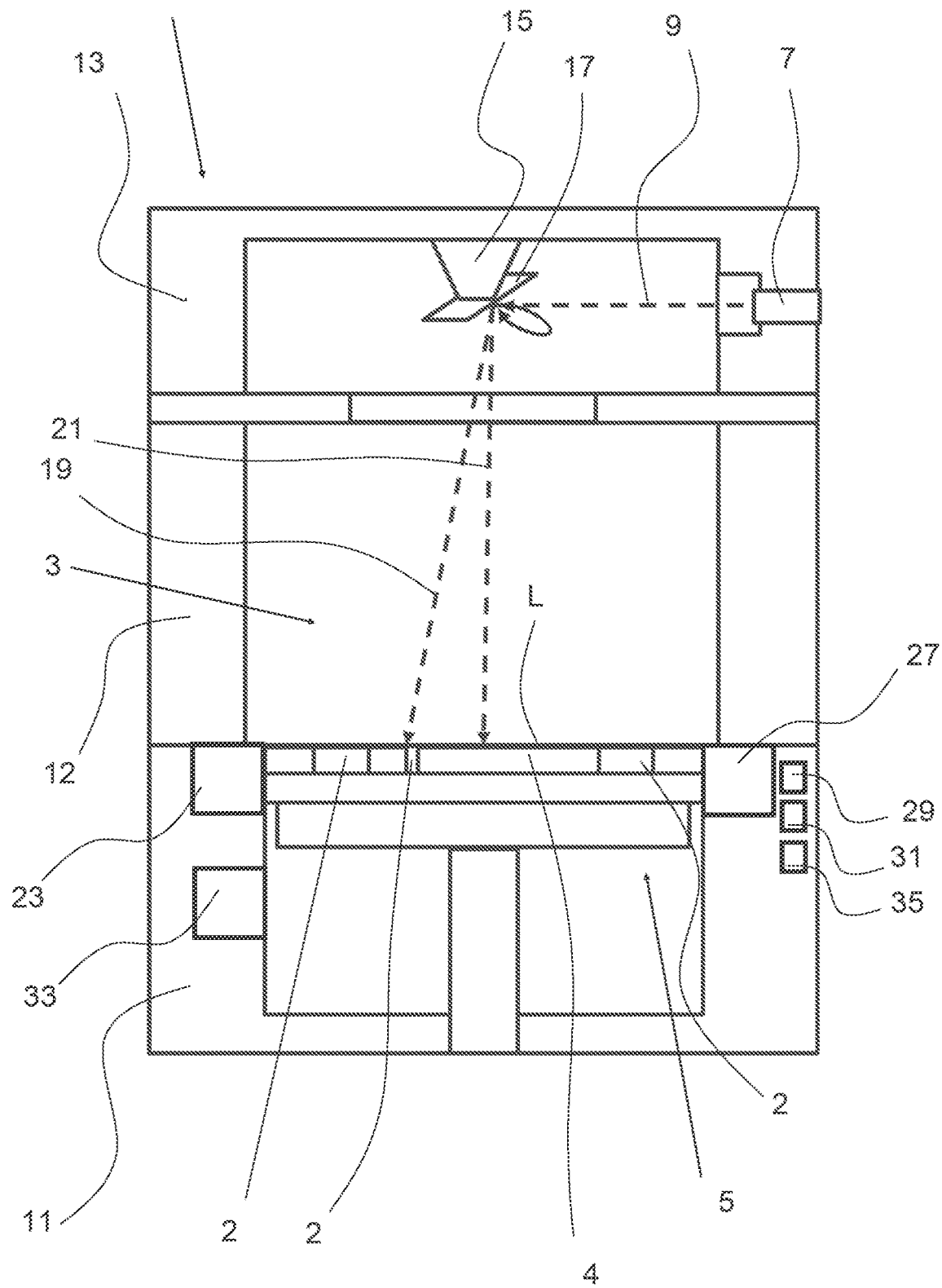
FIG. 2: shows a schematic overview of another apparatus according to the second aspect of the present disclosure.
Figure 3:
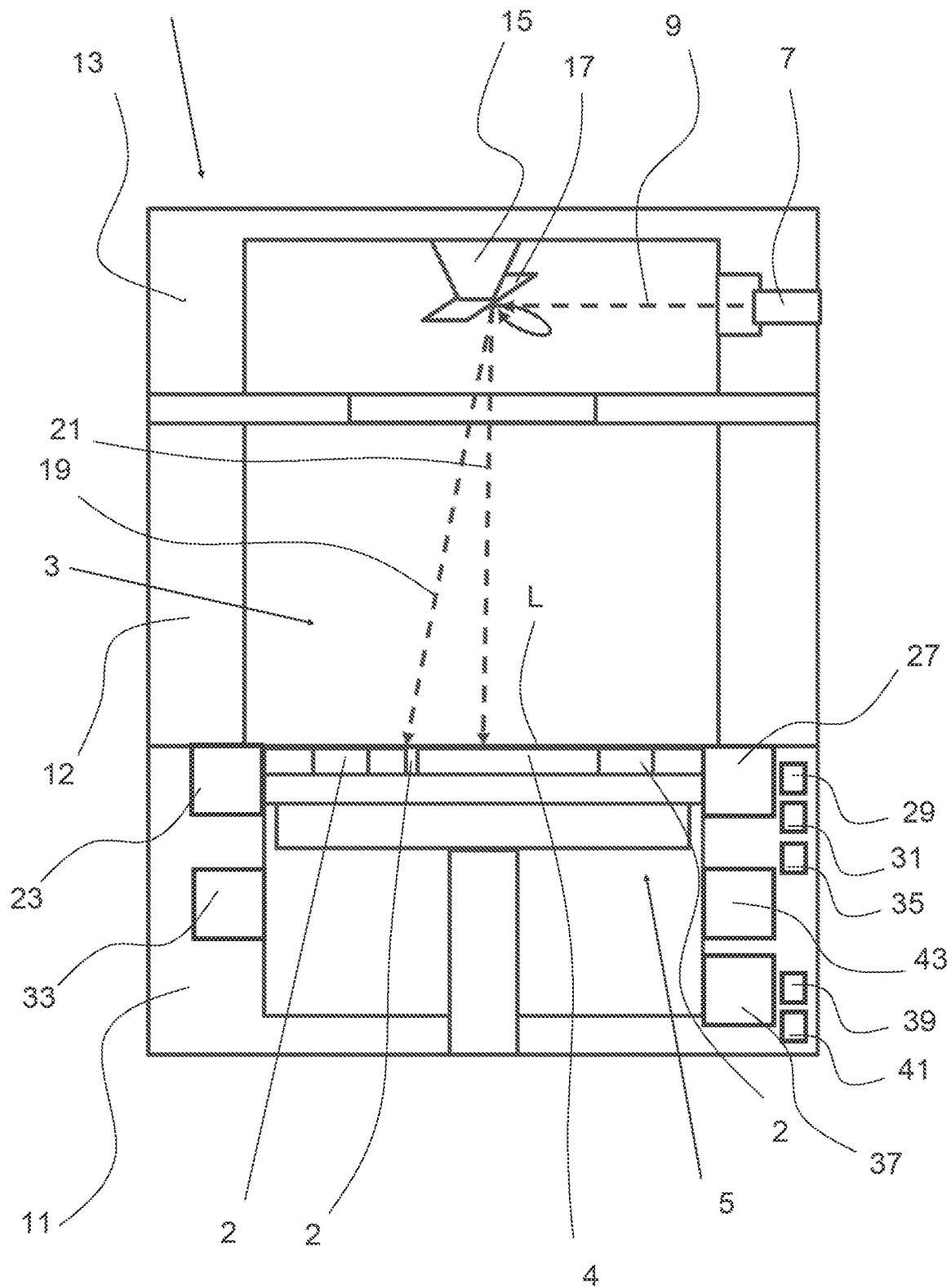
FIG. 3: shows a schematic overview of yet another apparatus according to the second aspect of the present disclosure.
Figure 4:
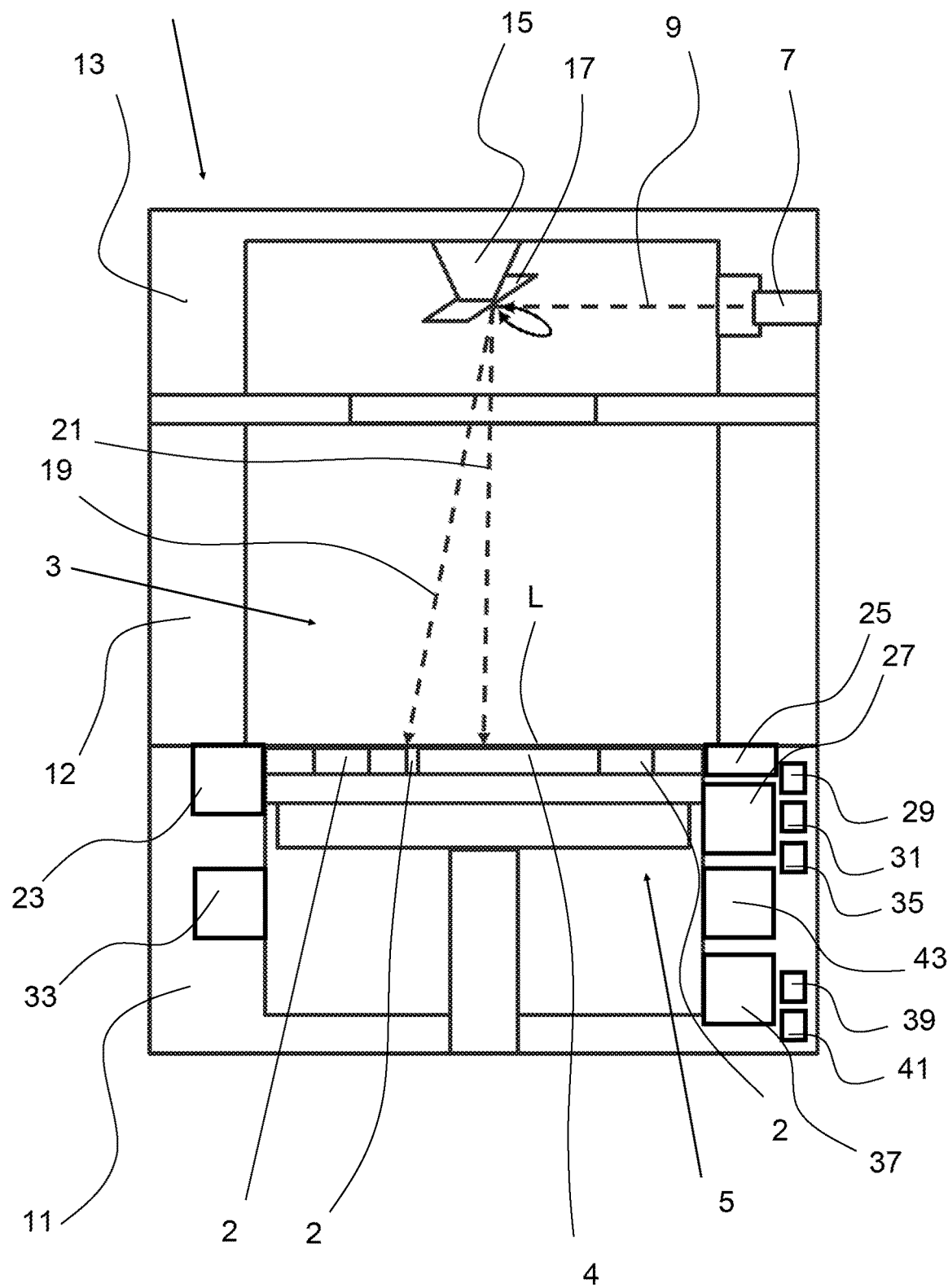
FIG. 4: shows a schematic overview of an apparatus according to the second aspect of the present disclosure.
Figure 5:
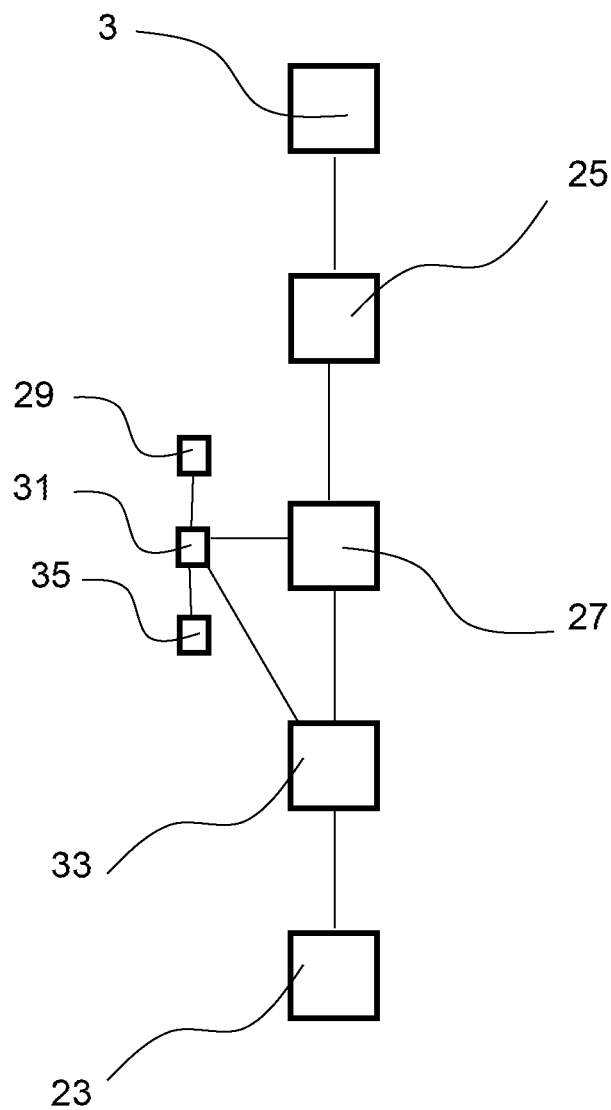
FIG. 5: shows elements of the apparatus from FIG. 1.
Figure 6:
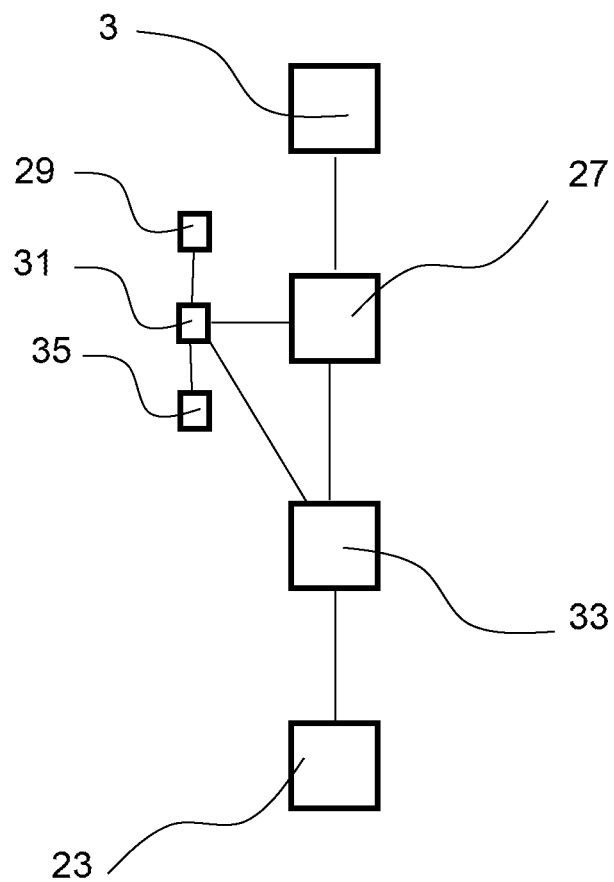
FIG. 6: shows elements of the apparatus from FIG. 2.
Figure 7:
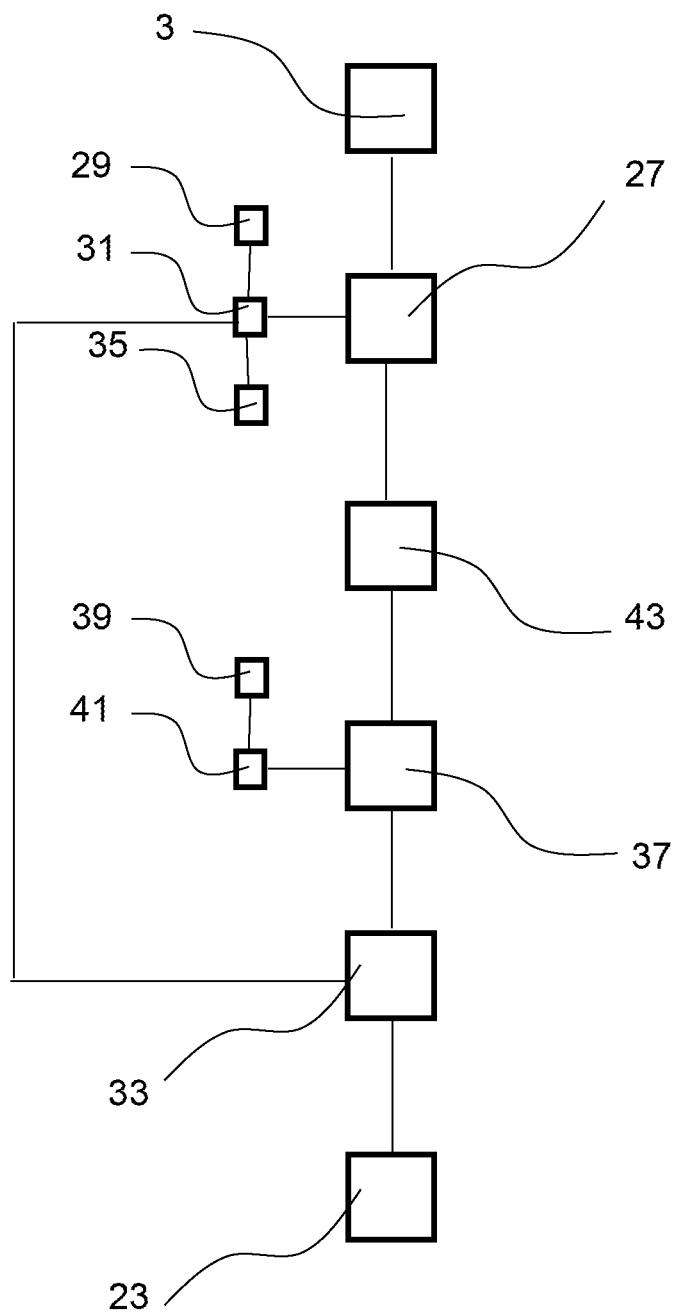
FIG. 7: shows elements of the apparatus from FIG. 3.
Figure 8:
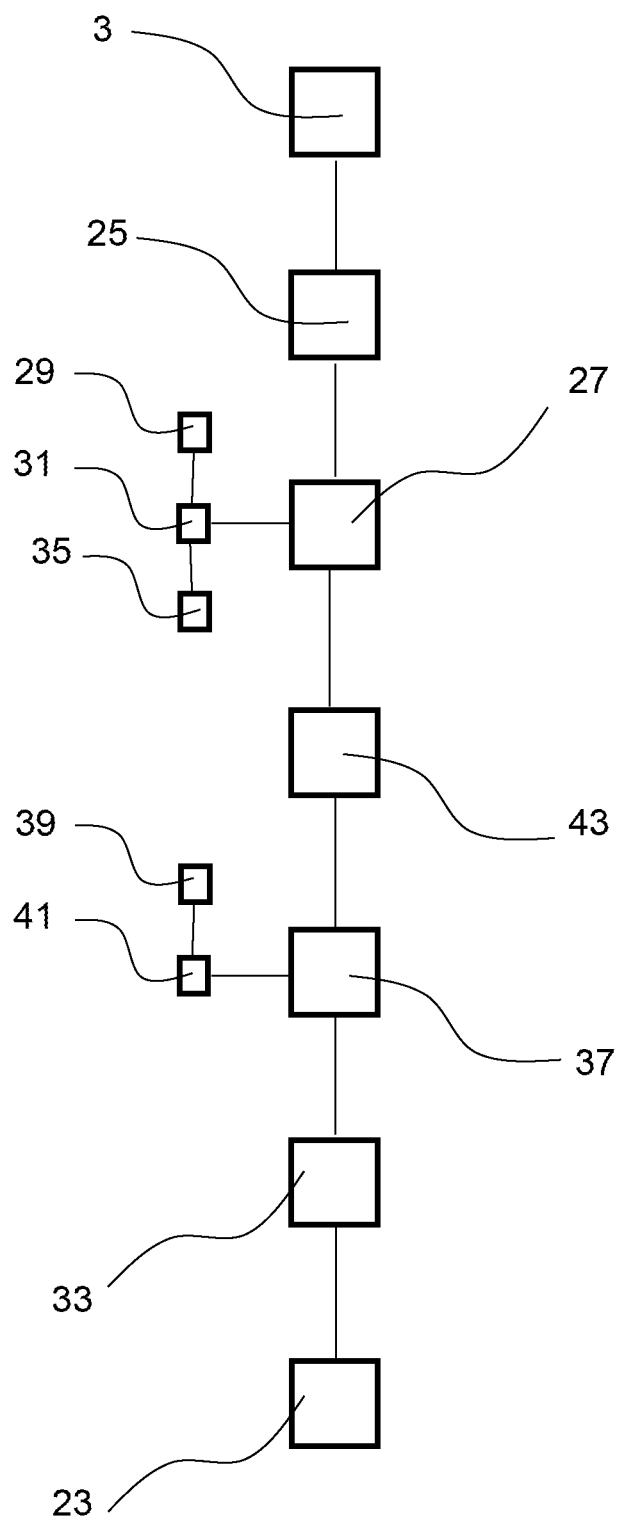
FIG. 8: shows element of the apparatus from FIG. 4.
Figure 9:
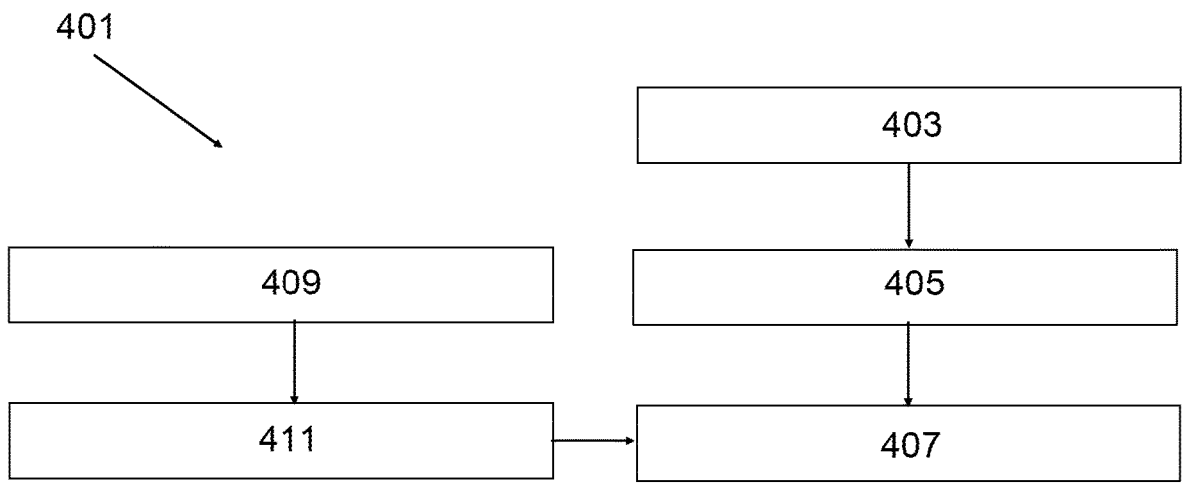
FIG. 9: shows a schematic overview of a method according to the first aspect of the present disclosure.
Figure 10:
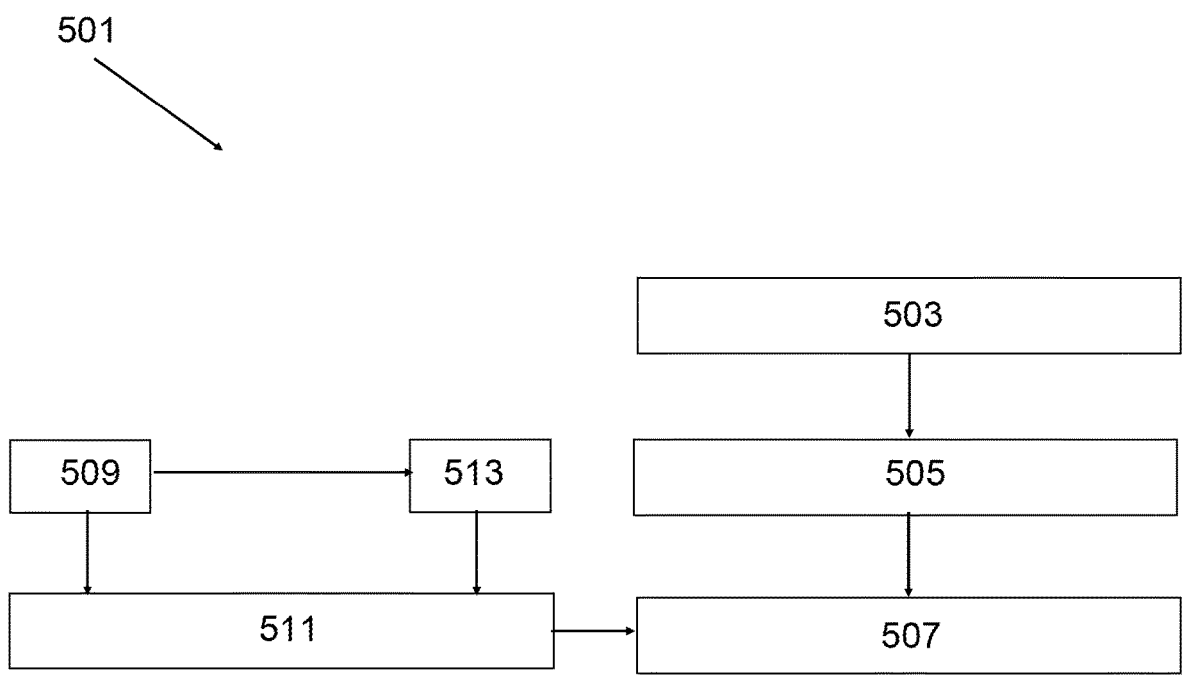
FIG. 10: shows a schematic overview of a another method according to the first aspect of the present disclosure.
Figure 11:
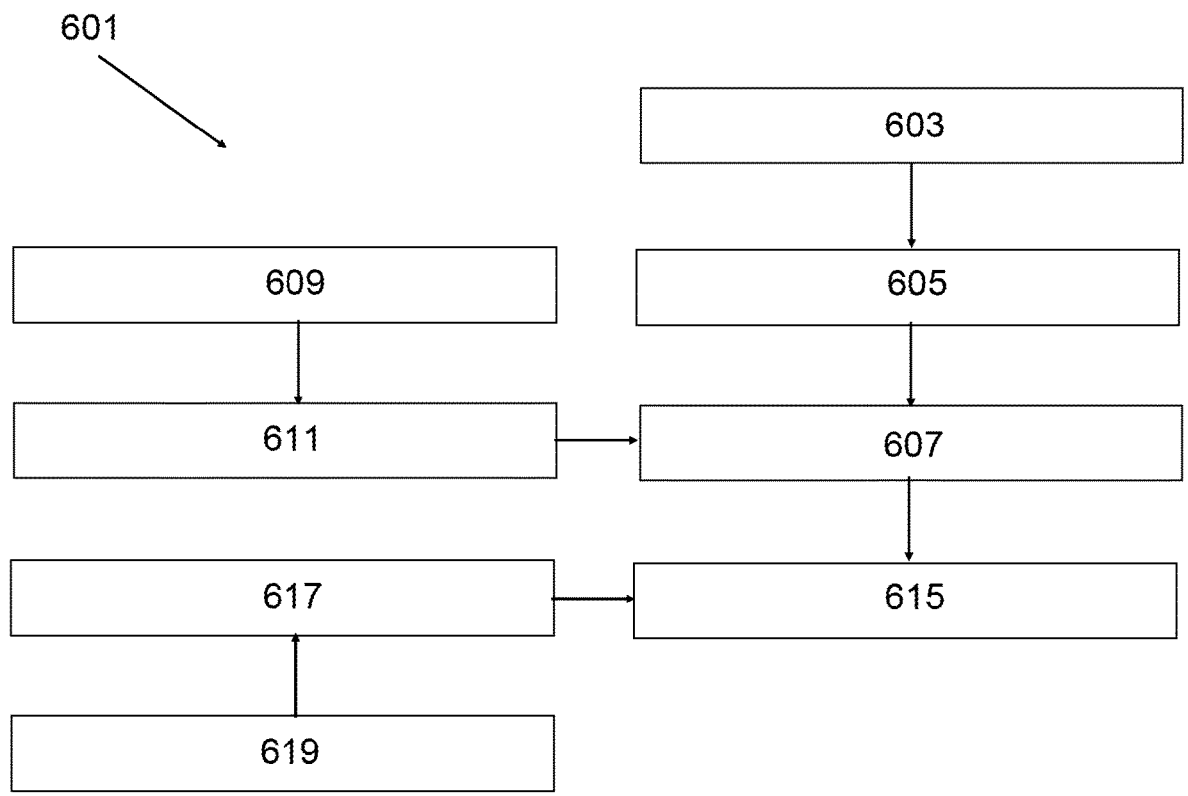
FIG. 11: shows a schematic overview of a method according to the first aspect.
Figure 12:
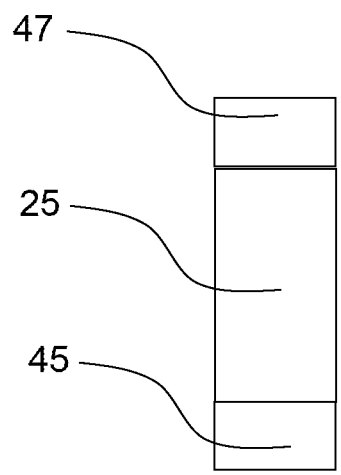
FIG. 12: shows elements of the apparatus from FIG. 1.
Figure 13:
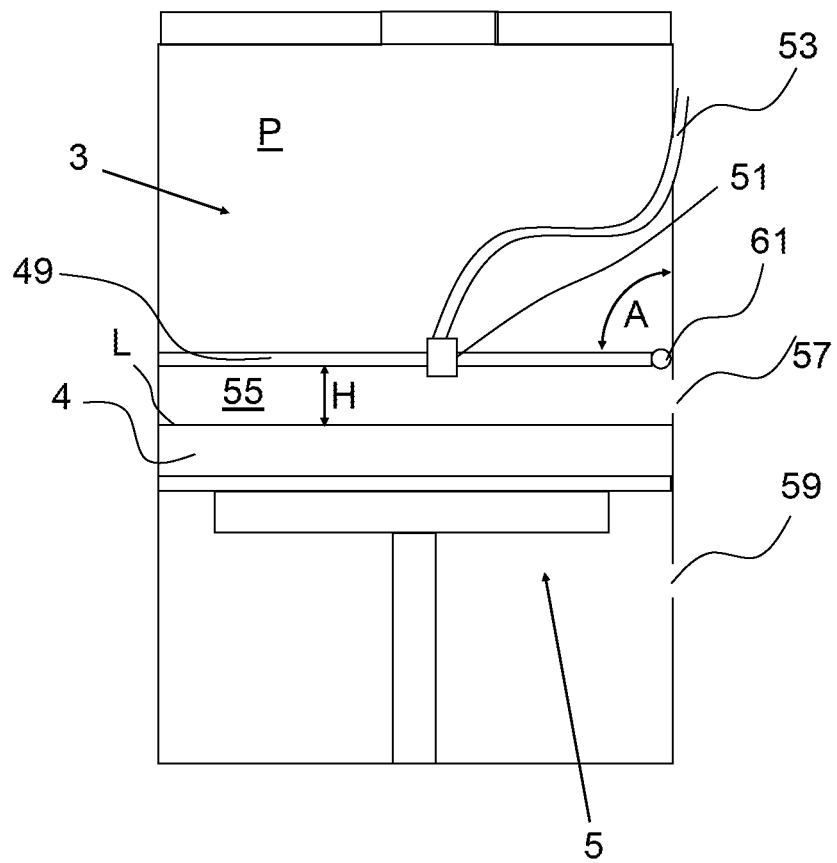
FIG. 13: shows elements of the apparatus from FIG. 1.

FIG. 1 shows an overview of an apparatus 1 for producing an object 2 by means of additive manufacturing. The apparatus 1 is built from several frame parts 11, 12, 13. The apparatus comprises a process chamber 3 for receiving a bath of material 4 which can be solidified. The material of said bath of material 4 is provided from a supply container 23. In a lower frame part 11, a shaft is formed, wherein a support 5 is provided for positioning the object 2 (or even objects) in relation to the surface level L of the bath of material 4. The support 5 is movably provided in the shaft, such that after solidifying a layer, the support 5 may be lowered, and a further layer of material may be applied and at least partly solidified on top of the part of the object 2 already formed. In a top part 13 of the apparatus 1, a solidifying device 7 is provided for solidifying a selective part of the material 4.

In the embodiment shown, the solidifying device 7 is a laser device, which is arranged for producing electromagnetic radiation in the form of laser light, in order to melt powdered material 4 provided on the support 5, which then, after cooling forms a solidified part of the object 2 to be produced. However, the invention is not limited to the type of solidifying device. As can be seen, the electromagnetic radiation 9 emitted by the laser device 7 is deflected by means of a displacement unit comprising a deflector unit 15, which uses a rotatable optical element 17 to direct the emitted radiation 9 towards the surface L of the layer of material 4. Depending on the position of the deflector unit 15, radiation may be emitted, as an example, according to rays 19, 21.

A buffer device in the form of a storage container 25 is arranged for collecting powdered material from said bath of material 4. Material may be collected, by said storage container 25, when applying a layer of powdered material on top of the part of the object 2 already formed. The material collected, by said storage container 25, during application of the layer of powdered material, is any powdered material that is provided in excess from said supply container 23 for forming the layer of powdered material as part of said bath op material 4.

Apparatus 1 further comprises an extraction device 27, a determining device 29 and a controlling device 31. The extraction device 27 is arranged for extracting powdered material from said storage container 25 originating from said bath of powdered material 4. The extraction device 27 comprises a pressure device for realizing a pressure in said extraction device 27 that is lower than a pressure in said storage container 25 and thereby generating a flow of gas for said extracting of said powdered material at an extraction rate from said storage container 25.

The determining device 29 is arranged for determining a measure for the extraction rate of said powdered material, realised by said extraction device 27, originating from said bath of powdered material 4 by determining a mass flow rate of powdered material extracted from said storage container 25 by said extraction device 27 taking into account a time dependent weight of said storage container 25. The time dependent weight of the storage container 25 may be determined by a weight sensor (not shown) that is communicatively coupled to said controlling device 31. As an alternative, or in addition to determining a time dependent weight of the storage container 25, it is conceivable that a time dependent weight of a separating device 33 such as a filter device is determined, wherein said extraction device 27 may be controlled, by said controlling device 31, taking into account said determined time dependent weight of the filter device 33. As a yet further alternative, or in addition to determining a time dependent weight of the storage container 25 or filter device 33, it is conceivable that a time dependent weight of the supply container 23 is determined, wherein said extraction device 27 may be controlled, by said controlling device 31, taking into account said determined time dependent weight of the supply container 23. The determining device 29 is further arranged for determining a measure for a separation rate realised by said separating device 33 arranged for filtering and/or sieving said powdered material originating from said bath of powdered material 4.

The controlling device 31 is communicatively coupled to said extraction device 27, said separating device 33 and said determining device 29 and arranged for controlling said extraction rate taking into account said determined measure of said extraction rate and/or for controlling said separation rate taking into account said determined measure of said separation rate. The extraction device 27 is further coupled for flow of said powdered material originating from said bath of powdered material 4 with said supply container 23 via filter device 33. Powdered material filtered by said filter device 33 may be supplied to said supply container 23 thereby allowing re-use of said powdered material. The controlling device 31 is further arranged for controlling said extraction device 27 such that said extraction rate is maintained below an upper extraction rate and/or for controlling said separation device 33 such that said separation rate is maintained below an upper separation rate. The upper extraction rate and/or the upper separation rate are determined taking into account specifications and/or historical operating conditions of the filter device 33 or historical operating conditions of a further filter device that is comparable to the filter device 33.

An evaluating device 35, comprised by said apparatus 1, is arranged for determining that said determined measure of said extraction rate corresponds to an extraction rate that is equal to or below a threshold extraction rate. The controlling device 31 is communicatively coupled to said evaluating device 35 and is yet further arranged for controlling said extraction device 27 such that extraction from said storage container 25 is stopped when said evaluating device 35 evaluates that said extraction rate is equal to or lower than a threshold extraction rate.

The storage container 25 is rigidly supported, at a bottom side thereof, in the apparatus 1 by a load cell 45. The load cell 45 forms a detector that is arranged for determining a measure of the weight of the storage container 25. The storage container 25 is maintained in an upright position in the apparatus 1 via a flexible connection 47 at the top side of the storage container 25. The flexible connection is constructed such that the storage container 25, apart from the load cell 45, is substantially free from external forces for allowing a relative accurate determination of the measure of the weight of the storage container 25.

Apparatus 1 further comprises a separating element 49 that is pivotably received via a pivot 61 in the process chamber 3 for pivoting the separating element through an angle A. The separating element 49 is arranged for separating, in a first position thereof, said bath of powdered material 4 from a part P of said process chamber 3. In the first position, the separating element 49 is provided at a distance H of said surface level L of said bath of powdered material 4, wherein said separating element 49 is substantially parallel to the surface level L. The separating element 49 is provided with a connector 51 for connecting a supply element 53 to the separating element 49 for supplying, via the supply element 53, the gas for generating the flow of gas to a volume 55 of the process chamber 3 between the separating element 49 and the surface level L. The gas may exit the volume 55 via a first exhaust opening 57 and/or a second exhaust opening 59 depending on the position of the support 5. The first exhaust opening 57 and the second exhaust opening 59 may be open or closed by a valve element (not shown). Alternatively or in addition, the first exhaust opening 57 may be closed by said separating element 49 when said separating element 49 is in a second position, wherein in said second position of said separating element 49 said object 2 may be manufactured, wherein in said first position of said separating element 49 said first exhaust 57 may be open for allowing said gas to flow from said volume 55 thereby extracting powdered material of said bath of powdered material 4 from said process chamber 3. Extraction of powdered material from the process chamber 3, via the second exhaust 57, may be blocked when said support 5 is positioned above a predetermined level. The supply element 53 is further arranged for realizing a pressure in said part P of said process chamber 3 that is equal or larger than a pressuring in said volume 55 of said process chamber 3 between said separating element 49 and said surface level L.

Apparatus 101 differs mainly from apparatus 1 in that the extraction device 27 is coupled directly for flow of powdered material to said process chamber 3. Elements of apparatus 101 that are similar to elements of apparatus 1 are provided with a reference number equal to the reference number of the element in apparatus 1.

Apparatus 201 differs mainly from apparatus 101 in that apparatus 201 comprises a further extraction device 37, a further determining device 39 and a further controlling device 41. Elements of apparatus 201 that are similar to elements of apparatus 101 are provided with a reference number equal to the reference number of the element in apparatus 101. The further extraction device 37 is arranged for extracting powdered material originating from said process chamber 3 via a further filter device 43. The further extraction device 37 comprises a further pressure device (not shown) for realizing a pressure in said further extraction device 37 that is lower than a pressure in said further filter device 43 and thereby generating a flow of gas for said extracting of said powdered material originating from said process chamber 3 at a further extraction rate. It is conceivable that the apparatus 201 comprises a buffer device that is arranged for buffering powdered material originating from said process chamber 3 between said extraction device 27 and said further filter device 43. Providing apparatus 201 with such a buffer device is beneficial for allowing a relative large difference between said extraction rate and said further extraction rate while realising relative favourable operating conditions of said filter device 43.

The further determining device 39 is arranged for determining a measure for the extraction rate of said powdered material, realised by said further extraction device 37, originating from said bath of powdered material 4 by determining a mass flow rate of powdered material extracted by said further extraction device 37 taking into account a time dependent weight of said further filter device 43 and/or a time dependent weight of said process chamber 3. The time dependent weight of the further filter device 43 and/or the process chamber 3 may be determined by a further weight sensor (not shown) that is communicatively coupled to said further controlling device 41. As an alternative, or in addition to determining a time dependent weight of the further separating device 43 such as a further filter device and/or the process chamber 3, it is conceivable that a time dependent weight of the buffer device is determined, wherein said further extraction device 37 may be controlled, by said further controlling device 41, taking into account said determined time dependent weight of the buffer device. As a yet further alternative, or in addition to determining a time dependent weight of the further filter device 43, process chamber 3 and/or the buffer device, it is conceivable that a time dependent weight of the supply container 23 is determined, wherein said further extraction device 37 may be controlled, by said further controlling device 41, taking into account said determined time dependent weight of the supply container 23. The determining device 29 is further arranged for determining a measure for a further separation rate realised by said further separating device 43 arranged for filtering and/or sieving said powdered material originating from said bath of powdered material 4.

The further controlling device 41 is communicatively coupled to said further extraction device 37, said further separation device 43 and said further determining device 39 and arranged for controlling said further extraction rate taking into account said determined measure of said further extraction rate and/or for controlling said further separation rate taking into account said determined measure of said further separation rate. The further extraction device 37 is further coupled for flow of said powdered material originating from said bath of powdered material 4 with said supply container 23 via filter device 33. Powder material filtered by said filter device 33 may be supplied to said supply container 23 thereby allowing re-use of said powdered material. The further controlling device 41 is further arranged for controlling said further extraction device 37 such that said further extraction rate is maintained below a further upper extraction rate and/or for controlling said further separation device 43 such that said further separation rate is maintained below a further upper separation rate. The further upper extraction rate and/or the further upper separation rate are determined taking into account specifications and/or historical operating conditions of the filter device 33 or historical operating conditions of a further filter device that is comparable to filter device 33.

Apparatus 301 differs mainly from apparatus 201 in that apparatus 301 comprises a storage container 25. Elements of apparatus 301 that are similar to elements of apparatus 1, 101 and 201 are provided with a reference number equal to the reference number of the element in apparatus 1, 101 and 201.

Method 401 comprises a step of receiving 403, in said process chamber 3, a bath of powdered material 4, wherein a surface level L of said bath of powdered material 4 defines an object working area. A subsequent step 405 of method 401 is solidifying, by the solidifying device 7, a selective layer-part of said bath of powdered material 4 on said surface level L. Powdered material originating from said bath of powdered material 4 may be removed, during or after said steps of receiving 403 and solidifying 405 during a step 407 of extracting, by the extraction device 27. The determining device 29 may determine, during a step 409 of determining, a measure for the extraction rate of said powdered material originating from said bath of powdered material 4, realised by said extraction device 27 during said step 407 of extracting. The extraction device 27 is controlled during a step 411 of controlling, by the controlling device 31, for controlling the extraction rate taking into account said determined measure of said extraction rate.

In an embodiment of method 401, during said step 407 of extracting, said separating device 33 is realising said separation rate of filtering and/or sieving said powdered material originating from said bath of powdered material 4, wherein, during said step 409 of determining, a measure for said separation rate realised by said separating device 33 is determined and wherein, during said step 411 of controlling, said separation rate is controlled taking into account said determined measure of said extraction rate and/or taking into account said determined measure of said separation rate.

The extraction rate may be controlled, during said step 407 of extracting, by controlling the flow rate of the flow of gas. The flow rate of the gas may be controlled by altering a pressure difference in the apparatus 1. Alternatively, or in addition to altering the pressure difference, the extraction rate may be controlled by changing a position of the support 5 in relation to the first exhaust opening 57 and the second exhaust opening 59. In an embodiment of method 401 the surface level L is brought to a level such that the first exhaust opening 57 is above said bath of material 4 and said gas is provided in said volume 55 while extraction of powdered material from said bath of powdered material 4 via said second exhaust opening 59 from said process chamber 3 is blocked.

In another embodiment of method 401 the support 5 is brought in such a position that powdered material from said bath of powdered material 4 may be exhausted from a lower part of said bath of powdered material 4 via the second exhaust opening 59.

Method 501 differs mainly from method 401 in that method 501 comprises a step 513 of evaluating, by the evaluating device 35, that said determined measure of said extraction rate corresponds to an extraction rate that is below a threshold extraction rate. Steps of method 501 that are similar to steps of method 401 are provided with a reference number equal to the reference number of the step in method 401 raised by 100. During said step of controlling 511, said extraction, by said extraction device 27, of said powdered material originating from said bath of powdered material 4 is stopped if said determined extraction rate is equal to or lower than said threshold extraction rate.

In an embodiment of method 501, the surface level L is brought to a level such that the first exhaust opening 57 is above said bath of material 4 and said gas is provided in said volume 55 while extraction of powdered material from said bath of powdered material 4 via said second exhaust opening 59 from said process chamber 3 is blocked. If, during the step 513 of evaluating, the evaluating device 35 determines that said measure of said extraction rate is below the threshold extraction rate, the support 5 is moved to a lower position wherein said powdered material from said bath of powdered material 4 may be exhausted from a lower part of said bath of powdered material 4 via the second exhaust opening 59 and thereby increasing the extraction rate of said powdered material from said bath of powdered material 4. Should the evaluating device 35, during said step 513 of evaluating, determine that the extraction rate is again lower than the threshold extraction rate the pressure difference in the apparatus 1 may be increased for increasing the extraction rate or alternatively extraction of powdered material from the process chamber 3 may be stopped.

Method 601 differs from method 401 in that method 601 comprises:
- a step 615 of further extracting, by a further extraction device 37, powdered material originating from said bath of powdered material 4;
- a step 617 of further determining, by a further determining device 39, a measure for a further extraction rate, realised by said further extraction device 37 during said step 617 of further extracting, of said powdered material originating from said bath of powdered material 4; and
- a step 619 of further controlling, by a further controlling device 41, said further extraction rate taking into account said determined further extraction rate.

Steps of method 601 that are similar to steps of method 401 are provided with a reference number equal to the reference number of the step in method 401 raised by 200. In an embodiment of method 601 it is conceivable that between said step 607 of extracting and said step 615 of further extracting said powdered material is subjected to a downstream process such as filtering, by filtering device 43.

Figure 14:
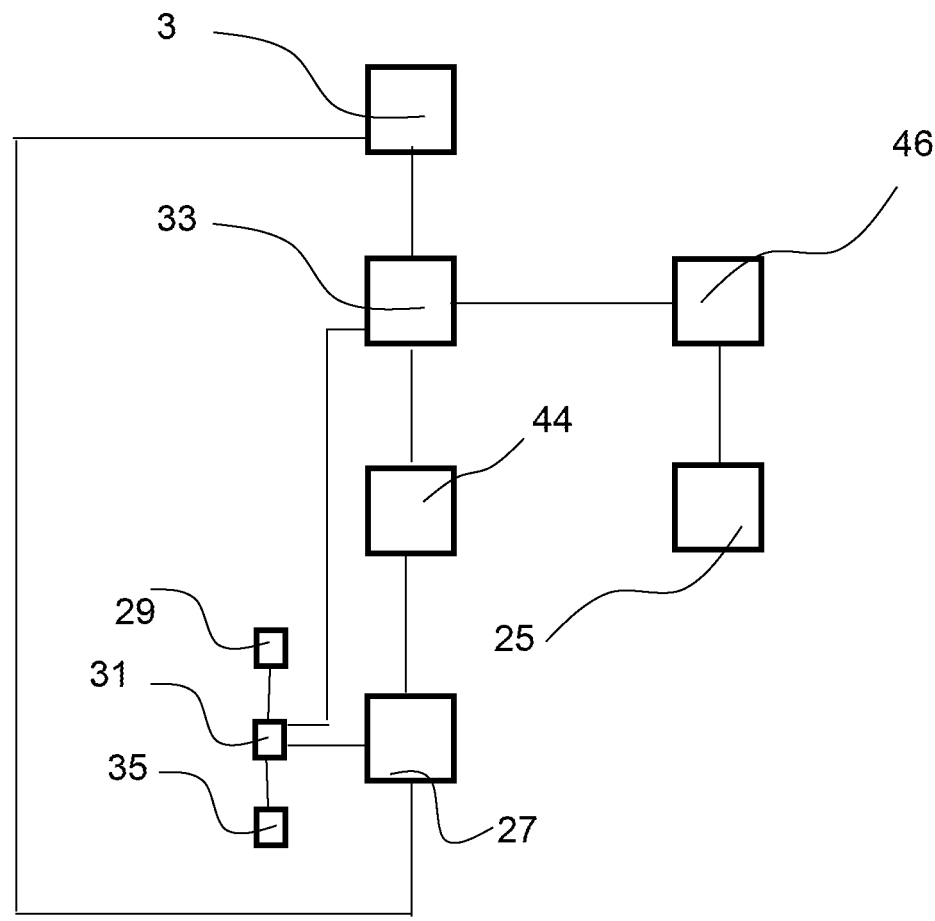
FIG. 14: shows elements of an apparatus according to the present disclosure.

FIG. 14 shows elements of an apparatus according to the present disclosure, wherein said apparatus differs mainly from apparatuses 1, 101, 201 and 301 in that said separating device 33 is place in between said process chamber 3 and said extracting device 27, wherein a yet further filter device 44 is provided between said separating device 27 and said extracting device 27. The embodiment according to FIG. 14 is beneficial for removing all, or at least substantially all, powdered material from said flow of gas before introducing said gas into said process chamber 3 for removing said powdered material from said bath of powdered material 4. This allows for recirculation of the gas within the apparatus during said removal of said powdered material from said bath of powdered material 4. Powdered material separated, by said separating device 33, from said flow of gas is directed, via another filter device 46 to said storage container 25.

The invention claimed is:

1. A method for producing an object by additive manufacturing, comprising the steps of:
   receiving, in a process chamber, a bath of powdered material, wherein a surface level of the bath of powdered material defines an object working area;
   solidifying, by a solidifying device, a selective layer-part of the bath of powdered material on the surface level;
   extracting, by an extraction device, powdered material originating from the bath of powdered material;
   separating, by a separating device, powdered material that is extracted by the extraction device; and
   controlling, by a controlling device:
      the extraction device for realizing an extraction rate of extracting powdered material originating from the bath of powdered material, wherein the extraction rate is maintained below an upper extraction rate; and
      the separating device for realizing a separation rate of filtering and/or sieving the powdered material originating from the bath of powdered material, wherein the separation rate is maintained below an upper separation rate,
      wherein the extraction rate and the separation rate are independently controllable by the controlling device; and
      wherein the separation rate is higher than the extraction rate.

2. The method according to claim 1, further comprising the step of:
   determining, by a determining device, a measure for the extraction rate of the powdered material, realized by the extraction device during the step of extracting, originating from the bath of powdered material and a measure for the separation rate realized by the separating device configured for filtering and/or sieving the powdered material that is extracted by the extraction device;
   wherein the step of controlling further comprises controlling, by the controlling device:
      the extraction rate, realized by the extraction device, according to the measure for the extraction rate and/or according to the measure for the separation rate; and
      the separation rate, realized by the separation device, according to the measure of the extraction rate and/or according to the measure of the separation rate.

3. The method according to claim 2, wherein during the step of determining, the measure for the extraction rate of the powdered material is at least one of:
   a volume flow of the powdered material, extracted by the extraction device; and
   a mass flow of the powdered material, extracted by the extraction device.

4. The method according to claim 3, wherein during the step of determining, the mass flow is determined by at least one of:
   determining a time dependent measure of a weight of the process chamber;
   determining a time dependent measure of a weight of a storage container, wherein the storage container, during the step of extracting, is receiving extracted powdered material; and
   determining a time dependent measure of a weight of the separating device, wherein the separating device, during the step of extracting, is filtering and/or sieving the powdered material that is extracted by the extraction device.

5. The method according to claim 2, further comprising the steps of:
   evaluating, by an evaluating device, that the measure of the extraction rate is below a threshold extraction rate; and
   stopping the extraction, by the extraction device, of the powdered material originating from the bath of powdered material.

6. The method according to claim 1, wherein during the step of extracting, the extraction device generates a flow of gas and wherein during the step of controlling the flow of gas is controlled for controlling the extraction rate.

7. The method according to claim 1, further comprising the steps of:
   extracting, by an additional extraction device, powdered material originating from the bath of powdered material;
   determining, by an additional determining device, a measure for an additional extraction rate, realized by the additional extraction device during the additional step of extracting, of the powdered material originating from the bath of powdered material; and
   controlling, by an additional controlling device, the additional extraction rate according to the determined additional extraction rate.

8. The method according to claim 7, wherein during the step of extracting and/or the additional step of extracting, by the extraction device and/or the additional extraction device, the powdered material is extracted from the process chamber.

9. The method according to claim 2, wherein during the step of determining, the separation rate is determined by:
   determining a time dependent measure of a weight of the separating device, wherein the separating device, during the step of extracting, is filtering and/or sieving the powdered material that is extracted by the extraction device;
   and at least one of:
   determining a time dependent measure of a weight of the process chamber; and
   determining a time dependent measure of a weight of a storage container, wherein the storage container, during the step of extracting, is receiving the powdered material that is extracted by the extraction device.

\* \* \* \* \*